No. 716,324. Patented Dec. 16, 1902.
J. W. WHALEN.
VEHICLE BRAKE.
(Application filed Mar. 13, 1902.)
(No Model.)
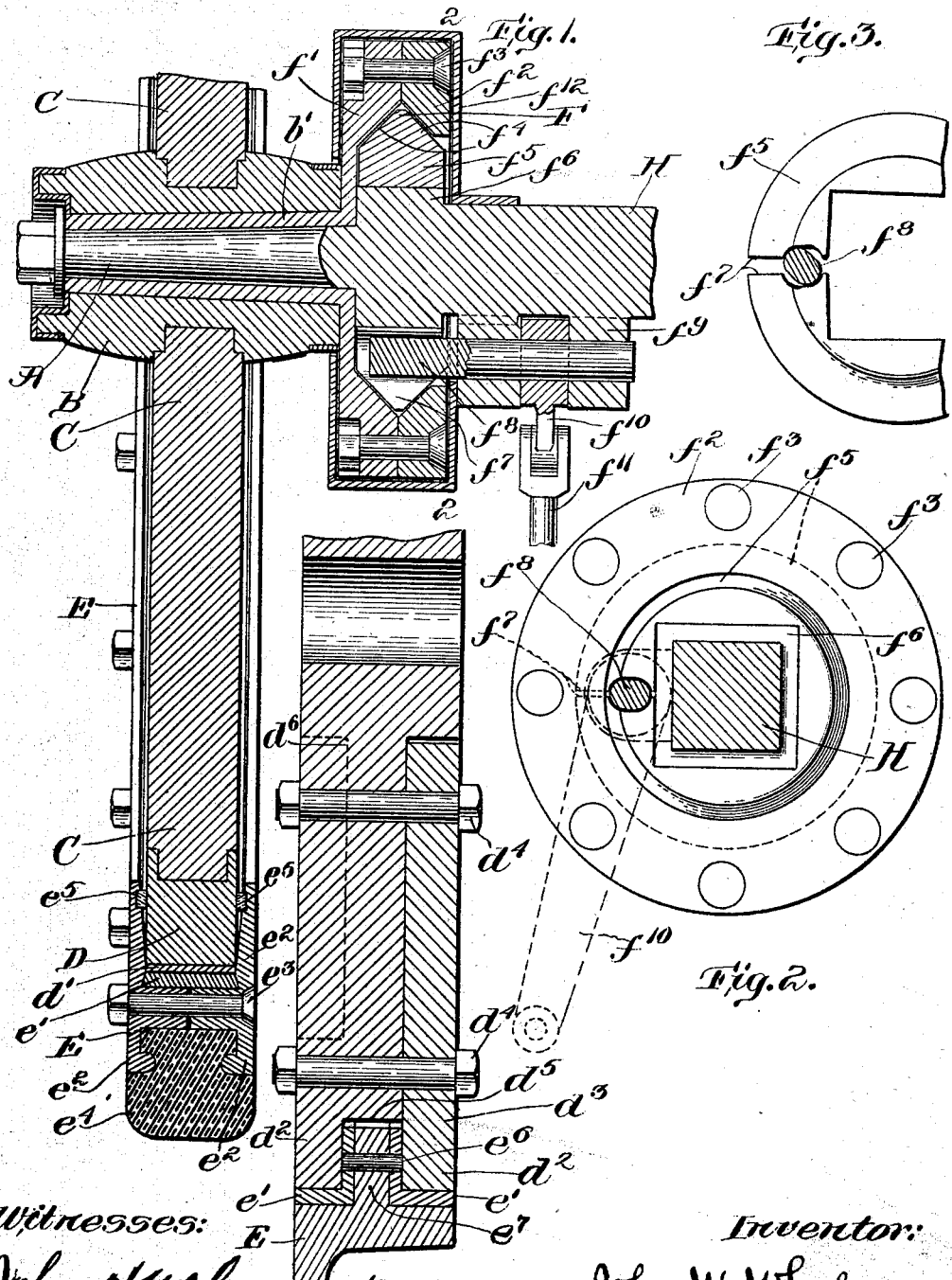
Witnesses:
John H. McGee
James M. Latta
Inventor:
John W. Whalen
by Everett E. Kent
Attorney.

UNITED STATES PATENT OFFICE.

JOHN W. WHALEN, OF CAMBRIDGE, MASSACHUSETTS, ASSIGNOR OF ONE-HALF TO JOHN H. McGEE, OF BOSTON, MASSACHUSETTS.

VEHICLE-BRAKE.

SPECIFICATION forming part of Letters Patent No. 716,324, dated December 16, 1902.

Application filed March 13, 1902. Serial No. 97,993. (No model.)

*To all whom it may concern:*

Be it known that I, JOHN W. WHALEN, a citizen of the United States, residing at Cambridge, in the county of Middlesex and State of Massachusetts, have invented a new and useful Improvement in Vehicle-Brakes, of which the following is a specification, reference being made to the accompanying drawings, in which—

Figure 1 is an elevation showing in vertical section my invention applied to a vehicle-wheel with connection to the axletree. Fig. 2 is a side elevation of a part of the device shown in Fig. 1, the view being taken at the surface 2 2 of Fig. 1. Fig. 3 is a detail, and Fig. 4 is a vertical section, showing my invention applied to a railway-car wheel.

My invention relates more particularly to devices for applying a powerful brake to a moving vehicle while in rapid motion or on a downward grade without injury to the tire, utilizing for that purpose the weight of the vehicle and its load. With the kinds of vehicle-brakes hitherto in use of which I have had knowledge there has been difficulty in managing heavy vehicles on a descending grade, especially those intended for rapid motion through city streets, such as fire-engines. For lack of a suitable brake it is not uncommon for teamsters to chain one wheel of the vehicle so that it cannot rotate and then drag the wagon and load on the roadway. This accomplishes the purpose of retarding the vehicle, but in a very crude way. Progress is slow, a hard exhausting pull of the horse is required to drag it, and the tire, if rubber, wears rapidly away. It is one of the objects of my device to obviate this and at the same time to provide a means by which the wagon and its load may be always under the driver's control, whether beyond control of the horse or not.

My device is especially suitable for use on fire-extinguishing apparatus, such as engines and ladder-trucks, where the importance of quick speed in responding to an alarm frequently leads drivers to take chances and run risks of damage to life and property that sometimes lead to sad and costly accidents. Chaining a wheel on the downgrades at such a time costs dangerous progress of the fire at a time when every moment's delay adds to the difficulty of suppressing it.

My invention is intended to enable an engine-driver or the crew of a truck to approach and start down a grade without slackening speed and to descend at a good speed with the apparatus always under control and without the strain upon the horses or the tires incidental to dragging a wheel upon the ground.

The device is also useful in mastering a runaway team of horses and in other ways, my general object being to provide a device which shall enable the speed of a vehicle to be retarded effectively and without undue wear of the tire on all occasions at the instant will of the driver or operator.

Referring to the drawings, A is an axle, B is the hub, C a spoke, and D the rim, of a wheel. The tread of the wheel is on an outer or incasing rim E, surrounding and fitting loosely upon it, being slightly larger in its inner diameter than the outer diameter of the rim D. The adjacent parts of the outer and inner rims are adapted to rub one against the other with friction, and for that purpose it is well to fit the rim D with a metal band $d'$, which bears against the inside of the rim E. The latter is also provided with a bearing-strip $e'$, which I prefer to make of metal softer than the band $d'$ against which it bears, so that the wear will come upon this strip rather than upon the surface of the inner rim D, and also I prefer to make it separable from the remainder of the rim E, so that it can be replaced when worn. In the wheel represented in the drawings, Fig. 1, the outer rim E is composed of the clamping side rings $e^2$, held together by bolts $e^3$, placed at suitable intervals around the periphery of the wheel, which rings clamp and hold rigidly in place the bearing-ring $e'$, above referred to, and the tire $e^4$, which in the wheel represented in the drawings is of rubber. The rings $e^2$ project inwardly toward the hub a little way, like flanges, thus partly incasing the rim D. They may be fitted interiorly with felt or rubber strips $e^5$, which press against the sides of the rim D, the purpose of which is to exclude dust, water, &c., from the bearing-surface between the two rims $e'$ $d'$. The relative diameters of these two bearing-surfaces are such that the entire device will under ordinary circumstances rotate on the axle and roll along the roadway as if it were one united wheel, and yet such that if the hub, spokes, and rim D be locked so that they cannot rotate upon the axle it will still be possible for the outer rim E to rotate upon and with respect to the inner rim D. It is therefore apparent that the diameter of the friction-surface of the rim E should be but slightly larger than the outer diameter of the rim D.

The hub B of the wheel is equipped with one member and the axletree H with the other member of a clutch F, which is adapted to lock the hub and axletree together to stop rotation at the will of the operator. I prefer to make this clutch simple in form. In that illustrated in the drawings the sleeve $b'$ of the hub is provided with a flange $f'$, which has an annular projection over the axletree, the outer part of this projection being a ring $f^2$, separable from the main portion of the flange and fastened thereto by a series of bolts $f^3$. This annular projection, attached to the hub, has a V-shaped groove $f^4$ cut on its inner side and constitutes one member of a clutch, the other member of which is a ring or disk $f^5$, having a V-shaped outer edge adapted to fit the groove $f^4$ and mounted on the axletree. The disk $f^5$ is pierced with a rectangular hole which fits upon a rectangular boss $f^6$ on the axletree, so that this disk or ring $f^5$ cannot rotate thereon. The ring $f^5$ is split at one place $f^7$, (shown clearly in Figs. 2 and 3,) and in the cleft is inserted one end of a rock-shaft $f^8$, which is journaled in a boss $f^9$, adjacent on the axletree, and may be rocked by means of a rock-arm $f^{10}$, one end of which is fast thereto and the other end of which is pivoted to a link $f^{11}$ or connecting-rod, which connects with and is operated by a lever within reach of the driver of the vehicle or other person who is to operate the brake. The portion of the rock-shaft which is inserted in the cleft of the ring is elliptical or cam-shaped, Fig. 3, so that when the shaft is turned the cleft is spread. The ring $f^5$ is elastic like a spring, so that normally the cleft is nearly closed, as shown in Fig. 2, and is made of such size that normally the hub and the outer member $f'$ of the clutch can rotate free of contact therewith, but the ring when the operator spreads it expands into the groove in the hub member of the clutch and becomes frictionally locked thereto, and hence to the hub.

An incasing covering $f^{12}$ may be fastened on the axletree to keep dust and foreign matter away from the bearing-surfaces of the clutch. In Fig. 2 this covering has been removed. In this figure also the rock-arm $f^{10}$ (not being shown) has its relative position indicated by dotted lines. For convenience of arrangement on the sheet the entire Fig. 2 is turned ninety degrees from the position the parts it represents occupy in Fig. 1 and Fig. 3 is turned to correspond.

The operation of this device will now be apparent. Assuming a vehicle to be traveling on the roadway, when the operator swings the rock-arm $f^{10}$ the cam-shaped end of the shaft $f^8$ spreads the split ring, thus clutching the hub, spokes, and rim D, so that they cannot rotate with respect to the axle, and thus the slip of rotation is transferred from the well-lubricated axle to the frictional bearing between the outer and inner rims of the wheel, where the friction may be great or small, as may be predetermined by selection of materials. It is important that the coefficient of friction between these surfaces be less than the coefficient between the tread of the wheel and the roadway to make sure that the slip occurs between them and not between the tread and the roadway. As the entire weight of the wagon and its load, so far as it rests upon the wheel, is exerted to produce pressure between the rims D and E, the friction is great and the vehicle is quickly stopped or slowed at the pleasure of the driver, with no greater effort on his part in applying the brake than is necessary to move the clutch F. Thus the momentum of the forward-moving vehicle is consumed in friction between the two rims without attendant wear upon the tire. Obviously the clutch F must be strong enough to transmit to the hub and rim D the entire momentum of the moving wagon and its load. It may without departure from the principle of my invention be made of any pattern that will accomplish the purpose. The tire may be of steel or rubber or other material, as desired, and there is no objection to providing a brake of the ordinary type bearing against the tire in addition, if desired. So, also, the wearing-strips $e'$ need not be fastened in place in the manner I have shown and may even be dispensed with altogether, and the bearing-surface of the braking-friction may be arranged farther from the tread than I have shown it and nearer the hub without departure from the principle of my invention; but the arrangement shown is that which I consider best.

In Fig. 4 the invention is shown as it may be applied to the wheel of a railway-car. In this form, in which the wheel is for simplicity represented as solid, the surface which corresponds to the surface of the inner rim is provided with a groove, into which an annular tongue or rib $e^7$ projects from the outer rim E, thus keeping the latter secure against sidewise displacement, the walls $d^2$ of the grooves serving as flanges corresponding to the side plates or flanges $e^2$ of Fig. 1. It is obvious that these retaining-flanges may be on either the outer or inner bearing-surfaces, and I have so shown them in the two views Figs. 1 and 4. Wearing-strips $e'$ may be inserted. I prefer to fit these to the inner diameter of the tire, so that in assembling the parts of the wheel they have to be pressed in and I further fasten them by inserting dowel-pins $e^6$, so that they are prevented from rotating with respect to the tire E. One of the flanges $d^2$ is integral with the main body of the wheel. The other of them is on a plate $d^3$, forming one side of the wheel, which is normally held in place by bolts $d^4$, but which is removable to permit of assemblage and when desired separation of the parts. The width of the shoulder $d^5$, which determines and constitutes the width of the groove, is such that when the plate $d^3$ is screwed down tight the projecting annular tongue $e^6$, with its bearing-strips $e'$, will make an easy fit in the groove. The bearing-strips are made angular, as shown, to provide for side bearing at times when the wheel is traveling on a curve. Since the axle of most railway-car wheels is rigidly attached to the wheel and rotates therewith, the clutch F is to be connected from either the hub of the wheel or the axle to some non-rotating part of the vehicle-frame. The dotted line $d^6$ represents a depression in the metal to lessen the weight of the wheel.

While I have shown and described a specific means for carrying into practical operation the principles of my invention, it should be understood that I do not limit myself to the specific form shown, which should be considered rather as merely illustrative of an operative embodiment of the invention.

I claim—

1. In a vehicle-brake, the combination with a vehicle-frame, of a wheel, a journal-bearing therefor on the frame, a rim fitting loosely upon and adapted to rotate about the wheel, said rim being adapted to run upon the roadway, a clutch arranged to lock the wheel against rotation relative to the vehicle-frame, and means to set and release the clutch.

2. In a vehicle-brake, the combination with a vehicle-frame, of a wheel, a journal-bearing therefor on the frame, a rim rigidly attached to the hub of the wheel and a second rim fitting loosely upon and adapted to rotate about the first rim, said second rim being adapted to run upon the roadway, a clutch arranged to lock the hub against rotation relative to the vehicle-frame, and means to set and release the clutch.

3. In a vehicle-brake, the combination with a vehicle-frame, of a wheel, a journal-bearing therefor on the frame, a rim fitting loosely upon and adapted to rotate about the wheel, said rim being adapted to run upon the roadway, a removable strip between the wheel and the rim, a clutch arranged to lock the wheel against rotation relative to the vehicle-frame, and means to set and release the clutch.

4. In a vehicle-brake, the combination with a vehicle-frame, of a wheel, a journal-bearing therefor on the frame, a rim fitting loosely upon and adapted to rotate about the wheel, said rim being adapted to run upon the roadway, a removable strip between said wheel and rim attached to one of the last-named parts and softer than the adjacent surface of the other of said parts and adapted to bear thereagainst, a clutch arranged to lock the wheel against rotation relative to the vehicle-frame, and means to set and release the clutch.

5. In a vehicle-brake, the combination with a vehicle-frame, of a wheel, a journal-bearing therefor on the frame, a rim loosely mounted on the wheel and adapted to rotate about it, flanges at the sides thereof arranged to hold the rim from sidewise displacement relative to the wheel, a clutch arranged to lock the wheel against rotation relative to the vehicle-frame, and means to set and release the clutch.

6. As a new article of manufacture, a wheel having an outer, circumferential portion mounted loose and rotatable upon an inner central portion; a support and journal-bearing for said inner portion; a clutch on said inner portion arranged to lock the same against rotation with respect to said support; and means to set and release the clutch.

7. In a vehicle-brake, in combination with a vehicle-frame, a wheel, a journal-bearing therefor on the frame, a rim fitting loosely upon and adapted to rotate about said wheel, said rim being adapted to run upon the roadway and to bear against the roadway with friction greater than the friction between it and the wheel, a clutch arranged to lock the wheel against rotation relative to the vehicle-frame, and means to set and release the clutch.

JOHN W. WHALEN.

Witnesses:
 JOHN H. MCGEE,
 EVERETT E. KENT.